(12) United States Patent
Shin et al.

(10) Patent No.: US 8,600,236 B2
(45) Date of Patent: Dec. 3, 2013

(54) OPTICAL COMMUNICATION MODULE FOR OPTICAL WAVELENGTH DIVISION MULTIPLEXING

(75) Inventors: Hyun Ee Shin, Daejeon (KR); Hee Dae Kim, Gwangju-Si (KR); Won Seok Jung, Gyeonggi-Do (KR); Ii Kim, Gyeonggi-Do (KR); Hyun Kuk Shin, Gyeonggi-Do (KR)

(73) Assignee: Opticis. Co., Ltd., Seongnam-si (KR)

( * ) Notice: Subject to any disclaimer, the term of this patent is extended or adjusted under 35 U.S.C. 154(b) by 220 days.

(21) Appl. No.: 13/003,753

(22) PCT Filed: Jul. 16, 2009

(86) PCT No.: PCT/KR2009/003922
§ 371 (c)(1),
(2), (4) Date: Jan. 11, 2011

(87) PCT Pub. No.: WO2010/008218
PCT Pub. Date: Jan. 21, 2010

(65) Prior Publication Data
US 2011/0110666 A1    May 12, 2011

(30) Foreign Application Priority Data

Jul. 16, 2008 (KR) .................... 10-2008-0069294
Jul. 10, 2009 (KR) .................... 10-2009-0063069

(51) Int. Cl.
*H04J 14/08* (2006.01)

(52) U.S. Cl.
USPC ................ 398/88; 398/85; 398/79; 398/135; 398/139

(58) Field of Classification Search
USPC ........ 398/79, 88, 85, 84, 43, 68, 135–139, 48
See application file for complete search history.

(56) References Cited

U.S. PATENT DOCUMENTS

| | | | | |
|---|---|---|---|---|
| 5,786,915 | A * | 7/1998 | Scobey | 398/82 |
| 6,512,578 | B1 * | 1/2003 | Komatsu et al. | 356/237.5 |
| 6,563,982 | B1 * | 5/2003 | Xie et al. | 385/33 |
| 6,856,722 | B2 * | 2/2005 | Sasaki et al. | 385/24 |
| 6,870,195 | B2 | 3/2005 | Lemoff et al. | |
| 7,013,069 | B1 * | 3/2006 | He et al. | 385/47 |
| 7,184,621 | B1 * | 2/2007 | Zhu | 385/24 |

(Continued)

OTHER PUBLICATIONS

European Search Report and Opinion in European Patent Application No. 09798121.1, dated Jun. 13, 2012.

(Continued)

*Primary Examiner* — Daniel Washburn
*Assistant Examiner* — Hibret Woldekidan
(74) *Attorney, Agent, or Firm* — Nixon Peabody LLP

(57) ABSTRACT

An optical communication module for optical wavelength division multiplexing includes a plurality of light devices emitting or receiving light beams having different wavelengths, a single optical fiber, and an optical elements arranged between the plurality of light devices and the single optical fiber and having a plurality of lens areas to converge a light beam starting from a single point at a plurality of points or light beams starting from a plurality of points at a single point. In the optical communication module, the plurality of lens areas are arranged such that the center points of the plurality of lens areas are located at the same distance from a point, and the single point and the plurality of points are located at the opposite sides with respect to the optical element.

6 Claims, 11 Drawing Sheets

(56) References Cited

U.S. PATENT DOCUMENTS

| | | | |
|---|---|---|---|
| 7,221,828 B2 | 5/2007 | Nakayama et al. | |
| 7,359,596 B2 * | 4/2008 | Sugiyama et al. | 385/33 |
| 7,372,033 B1 * | 5/2008 | Stevens et al. | 250/339.01 |
| 8,036,533 B2 * | 10/2011 | Hosomi et al. | 398/79 |
| 8,160,451 B2 * | 4/2012 | Liu et al. | 398/138 |
| 8,303,195 B2 * | 11/2012 | Adachi et al. | 385/93 |
| 2004/0027631 A1 * | 2/2004 | Nagano et al. | 359/196 |
| 2004/0033010 A1 | 2/2004 | McGuire, Jr. | |
| 2004/0071466 A1 | 4/2004 | Buckman et al. | |
| 2004/0101306 A1 * | 5/2004 | Morita et al. | 398/85 |
| 2004/0218875 A1 * | 11/2004 | Lemoff et al. | 385/89 |
| 2005/0069013 A1 | 3/2005 | Bhandarkar et al. | |
| 2005/0175276 A1 | 8/2005 | Hashizume et al. | |
| 2005/0175347 A1 | 8/2005 | Ray et al. | |
| 2007/0206953 A1 * | 9/2007 | Lee et al. | 398/135 |
| 2008/0193135 A1 * | 8/2008 | Du et al. | 398/88 |
| 2009/0097847 A1 * | 4/2009 | Hosomi et al. | 398/43 |

OTHER PUBLICATIONS

International Search Report, PCT/KR2009/003922, dated Feb. 24, 2010.
Written Opinion of International Searching Authority, PCT/KR2009/003922, dated Feb. 24, 2010.

* cited by examiner

OPTICAL COMMUNICATION MODULE FOR OPTICAL WAVELENGTH DIVISION MULTIPLEXING

CROSS-REFERENCE TO RELATED PATENT APPLICATIONS

This application is a national phase of International Application No. PCT/KR2009/003922, entitled, "Optical Communication Module For Optical Wavelength Division Multiplexing", which was filed on Jul. 16, 2009, and which claims priority of Korean Patent Application No. 10-2008-0069294, filed Jul. 16, 2008 and Korean Patent Application No. 10-2009-0063069, filed Jul. 10, 2009.

BACKGROUND OF THE INVENTION

1. Field of the Invention

The present invention relates to an optical communication module, and more particularly, to an optical communication module for optical wavelength division multiplexing which can transmit or receive light beams having multiple wavelengths using a single optical fiber.

2. Description of the Related Art

Wavelength division multiplexing (WDM) is used for transmitting optical signals having different wavelengths using a single optical fiber. U.S. Pat. No. 6,870,195 discloses a method of combining multiple optical signals into a single optical fiber by arranging emission windows of light emission elements emitting light beams having different wavelengths close to each other. According to this method, while the multiple optical signals can be combined into a single optical fiber using simple optical parts, the emission windows of the light emission elements must be arranged close to each other.

U.S. Pat. No. 7,221,828 discloses a method of splitting multiple wavelength light beams emitted from a single optical fiber by using an optical filter for filtering only a light beam having a particular wavelength. According to this method, since several filters are used and alignment is needed for each wavelength, a system is complicated and manufacturing costs are high.

SUMMARY OF THE INVENTION

The present invention provides an optical communication module for optical wavelength division multiplexing which is embodied in a simple form of an optical part for combining light beams having different wavelengths using a single optical fiber or splitting a light beam emitted from a single optical fiber into multiple light receiving elements in terms of a wavelength.

According to an aspect of the present invention, an optical communication module for optical wavelength division multiplexing includes a plurality of light devices emitting or receiving light beams having different wavelengths, a single optical fiber, and an optical elements arranged between the plurality of light devices and the single optical fiber and having a plurality of lens areas to converge a light beam starting from a single point $P_0$ at a plurality of points $P_1$ or light beams starting from a plurality of points at a single point, wherein the plurality of lens areas are arranged such that the center points of the plurality of lens areas are located at the same distance from a point, and the single point and the plurality of points are located at the opposite sides with respect to the optical element.

The optical element may include a first lens located close to the plurality of points and having the plurality of lens areas, and a second lens located close to the single point.

The optical element may further include a wavelength selective member having a plurality of filter areas for selectively transmitting a light beam having a predetermined wavelength and disposed between the first and second lenses.

The wavelength selective member may include two filter areas and the two filter areas are formed of an edge filter or a wavelength selective filter.

The wavelength selective member may include three or more filter areas and, of the three or more filter areas, the filter areas for the longest wavelength channel and the shortest wavelength channel are formed of edge filters and at least one filter area for an intermediate wavelength channel is formed of the wavelength selective filter.

The wavelength selective member may include two or more filter areas that are formed of the wavelength selective filters.

Each of the filter areas of the wavelength selective member may have a rectangular shape, a parallelogram shape in which one angle is 60° and the other angle is 120°, or a regular triangle shape in which all angles are equally 60°.

One of the first and second lenses may be a lens producing a parallel beam and the other one is a focusing lens so that a light beam travels in form of a parallel beam between the first and second lenses.

The optical communication module may further include a path change member changing an optical path by 90°, having an inclined surface inclined at 45° and provided on the optical path between the light devices and the optical fiber.

The light devices, the optical element, and the optical fiber may be arranged in a line.

The optical communication module may further include a sub-mount having a step structure, wherein the light devices are attached at the step structure of the sub-mount.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
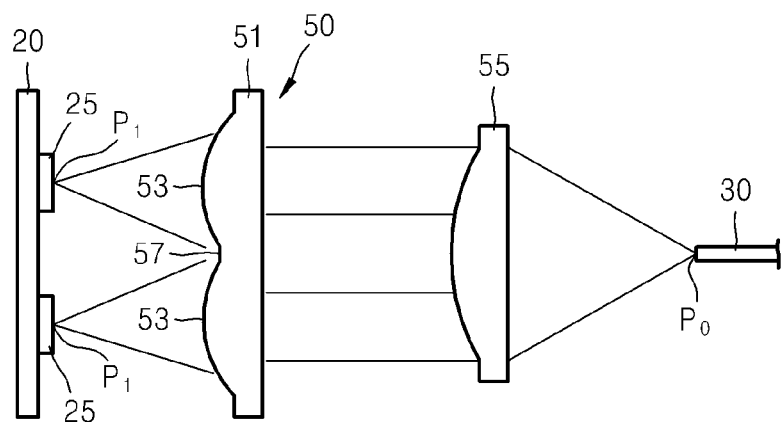
FIGS. 1 and 2 schematically illustrate optical communication modules for optical wavelength division multiplexing according to exemplary embodiments of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
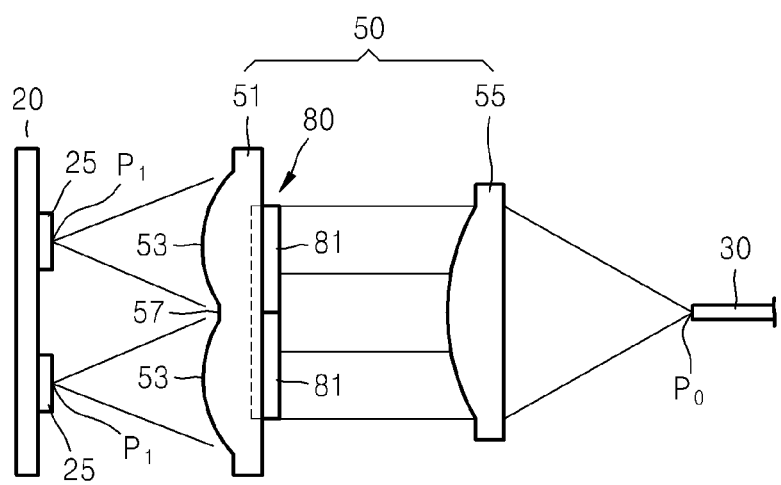

FIGS. 1 and 2 schematically illustrate optical communication modules for optical wavelength division multiplexing according to exemplary embodiments of the present invention. Referring to FIGS. 1 and 2, an optical communication module includes a plurality of light devices 25 mounted on a sub-mount 20, a single optical fiber 30, and an optical element 50 arranged between the light devices 25 and the optical fiber 30 and having a plurality of lens areas to make a light beam starting from a single point $P_0$ converge onto a plurality of points $P_1$, or light beams starting from a plurality of points $P_1$ converge onto a point $P_0$. The single point $P_0$ and the plurality of points $P_1$ may be located at opposite sides with respect to the optical element 50.

The light devices 25 may be light emitting devices or light receiving devices that emit or receive light beams having wavelengths different from each other. For example, the light devices 25 may be light emitting devices emitting light beams having different wavelengths, i.e., edge-emitting semiconductor laser or vertical cavity surface-emitting semiconductor laser (VCSEL). Also, the light devices 25 may be a plurality of light receiving devices.

The light devices 25 are mounted on the sub-mount 20. The sub-mount 20 may be fixed on, for example, a printed circuit board (PCB). The optical fiber 30 may be supported by being inserted in a receptacle (not shown). FIG. 1 illustrates an example in which light input/output surfaces of the optical fiber 30 are arranged to face the light devices 25, that is, the light devices 25, the optical element 50, and the optical fiber 30 are arranged in a line. As described later, the optical communication module may be configured by further including a path change member that changes an optical path between the light devices 25 and the optical fiber 30 by about 90°. Optical parts constituting the optical communication module are installed in a housing by using mechanical structures. Since the mechanical structures are well known in the technical field to which the present invention pertains, illustrations and detailed descriptions thereof will be omitted herein.

The optical element 50 may include a lens for producing a parallel beam and a focusing lens, to make a light beam starting from a point converge at a plurality of points or light beams starting from a plurality of points converge at a point.

Also, a wavelength selective member that is formed of a wavelength selective filter, an edge filter, or a combination thereof for passing a particular wavelength may be provided at an intermediate area of the lens that is separated into two parts. The arrangement and number of a filter area of the wavelength selective member may be provided corresponding to those of the light devices 25. Each filter area may be formed of a wavelength selective filter or an edge filter.

The wavelength selective filter transmits light beams having wavelength bands of about ±4-8 nm with respect to a particular wavelength and reflects light beams of other channels. When only two channels are used in the optical communication module, an edge filter may be used which simply transmits a wavelength longer than a particular wavelength and reflects a wavelength shorter than the particular wavelength is reflected, and vice versa. An edge filter working as above is simpler and cheaper than the wavelength selective filter.

Figure 3A:
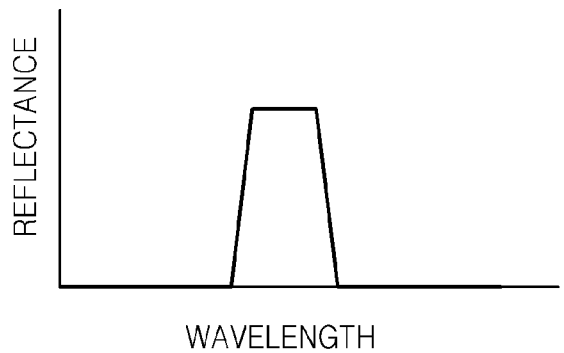
FIG. 3A is a graph showing the reflectance of a wavelength selective filter.

FIG. 3A shows the reflectance of the wavelength selective filter. Referring to FIG. 3A, the reflectance is high only in a particular range and low in the other range so that only a light beam having a wavelength of a low reflectance may be selectively transmitted while light beams having the other wavelengths may be filtered out. Thus, when the wavelength selective member is configured by combining multiple wavelength selective filters, optical communication for optical wavelength division multiplexing is available so that light beams having multiple wavelengths may be transmitted through a single optical fiber.

Figure 3B:
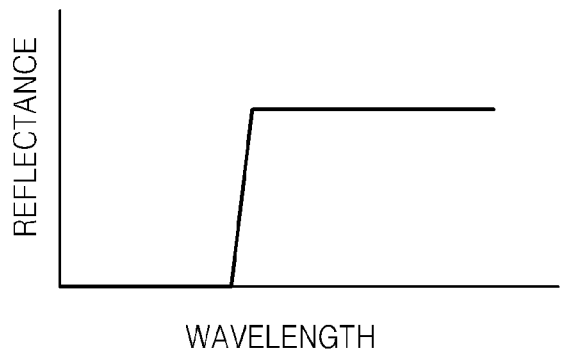
FIGS. 3B and 3C are graphs showing a feature of an edge filter that reflects or passes a light beam having a wavelength longer than a particular wavelength.
Figure 3C:
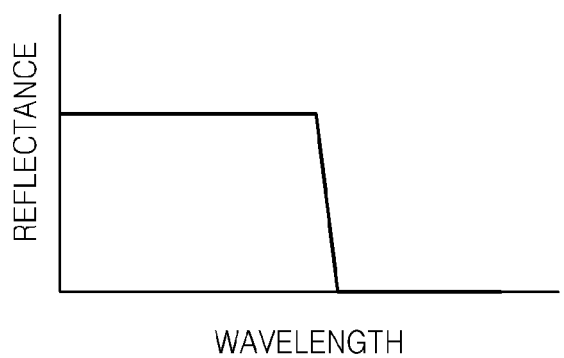

Unlike the wavelength selective filter having a reflection range of a particular width, the edge filter transmits or reflects a light beam having a wavelength longer than a particular wavelength, as shown in FIGS. 3B and 3C. Since the edge filter is manufactured easier than the wavelength selective filter so that the manufacturing costs may be low. When three or more channels are to be used, the edge filter, not the wavelength selective filter, is used for both end channels and the wavelength selective filter is used only for the intermediate channel, to thus constitute the wavelength selective member. Thus, the manufacturing costs may be reduced without a change in the performance of the wavelength selective member.

In detail, the optical element 50 may include a first lens 51 and a second lens 55 as illustrated in FIG. 1. The optical element 50 may be provided such that the light can travel in form of a parallel beam between the first and second lenses 51 and 55. When the light devices 25 are light emitting devices, the first lens 51 is a lens converting a divergent light emitted from each of the light devices 25 into a parallel beam and the second lens 55 is a focusing lens focusing an incident parallel beam to be input to the optical fiber 30 that is single. When the light devices 25 are light receiving devices, the light proceeds along the reverse path.

The first lens 51 may be located between the light devices 25 and the second lens 55 and may have a plurality of lens areas 53. The second lens 55 may be located between the first lens 51 and the optical fiber 30 and have a single lens area. The lens area 53 may be formed on the surface of the first lens 51 facing the light device 25. Alternatively, the lens areas 53 may be formed on the surface of the first lens 51 facing the second lens 55. Also, the lens areas 53 may be formed on both surfaces of the first lens 51.

The lens areas 53 may have convex lens surfaces or Fresnel lens surfaces. Each of the lens areas 53 may be provided to focus the light beam emitted from each of the light devices 25 in form of a divergent light or focus the light transmitted from the second lens 55 at each of the light devices 25.

Figure 4:
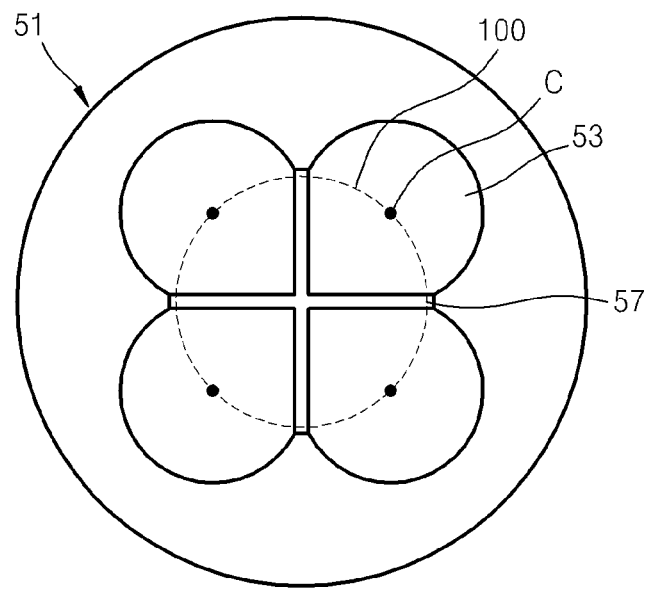
FIG. 4 illustrates a surface in which a plurality of lens areas of the first lens of FIGS. 1 and 2 are formed.

FIG. 4 illustrates a surface in which the lens areas 53 of the first lens 51 of FIGS. 1 and 2 are formed. The number of the lens areas 53 formed on the first lens 51 corresponds to that of the light devices 25.

The lens areas 53 may be arranged such that the centers of the lens areas 53 are located at the same distance from a point. For example, each of the lens areas 53 may have a convex lens surface. In this case, the lens areas 53 may be arranged such that the apexes C of the convex lens surfaces of the lens areas 53 can be located on the circumference of a circle 100 with respect to a point. Also, the lens areas 53 may be arranged in form of, for example, a triangle, a quadrangle, or a hexagon, according to the number of the lens areas 53. Although each of the lens areas 53 has a circular shape, to improve an efficiency of a receiving part, the lens areas 53 may be formed such that overlapping portions between the lens areas 53 exist and the overlapping portions may be linearly cut off, as illustrated in FIG. 4, so that the overlapping portion may be prevented from being generated.

FIG. 4 illustrates an example of the lens areas 53 having four convex lens surfaces being located in a quadrangle form. That is, at least one lens surface of the first lens 51 may have a structure of combining four lenses. The number of lenses to be combined may vary according to the number of the light devices 25. That is, the lens areas 53 have a structure of combining a plurality of lenses and may be provided in the number corresponding to the number of the light devices 25.

The second lens 55 may have at least one convex lens surface or Fresnel lens. In FIG. 1, the surface of the second lens 55 facing the first lens 51 is formed to be a mono-lens area, for example, a convex mono-lens surface. Alternatively, the surface of the second lens 55 facing the optical fiber 30 may be a convex lens surface. Both surfaces of the second lens 55 may be convex lens surfaces. Also, at least one surface of the second lens 55 may have the lens areas 53 like the first lens 51, instead of the mono-lens area.

The first and second lenses 51 and 53 make the light beam starting from a point $P_0$ converge onto a plurality of points $P_1$, or the light beams starting from the plurality of points $P_1$ converge onto the point $P_0$. The first and second lenses 51 and 53 may be variously modified only when the light travels in form of a parallel beam between the first and second lenses 51 and 55.

That is, the first and second lenses 51 and 55 may be formed and arranged such that light can travel in form of a parallel beam between the first and second lenses 51 and 55, when the light devices 25 are light emitting devices and located at focal points of the lens areas 53, or when the light devices 25 are light receiving devices and the light input/output surface of the optical fiber 30 is located at the focal point of the second lens 55.

When the wavelength selective member 80 is inserted in the optical element 50 as described later with reference to FIG. 2, the light needs to be traveling in form of a parallel beam between the first and second lenses 51 and 55. When the wavelength selective member 80 is not included in the optical element 50 as illustrated in FIG. 1, the light does not need to be traveling in form of a parallel beam between the first and second lenses 51 and 55. Thus, in the case of FIG. 1, in an actual design, the first and second lenses 51 and 55 may be variously modified under the condition that the light beam starting from a point is converged at a plurality of points or the light beams starting from a plurality of points are converged at a point.

Accordingly, the light beam starting from a point may be converged at a plurality of point or the light beams starting from a plurality of points may be converged at a point by the optical element 50 including the first and second lenses 51 and 55.

FIG. 1 illustrates an example of an optical system structure of an optical communication module that may be applied when the light emitting devices are provided as the light devices 25. The optical communication module having the light emitting devices as the light devices 25 corresponds to a transmitting apparatus. When multiple light emitting devices emitting light beams having different wavelengths are used as the light devices 25, multiple optical signals having different wavelengths may be combined in the optical fiber 30 that is single by the optical element 50.

The optical communication module having light receiving devices as the light devices 25 corresponds to a receiving apparatus. In the optical communication module according to the preset exemplary embodiment, when the light beam output from the optical fiber 30 that is single is split and transmitted to a plurality of light receiving devices, optical wavelength division multiplexing communication is available only when each light receiving device can receive only one optical signal having a wavelength.

When light beams having various wavelengths are mixed together, to receive only on a light beam having a wavelength, a band pass filter, that is, the wavelength selective filter or the edge filter, may be used. To receive an optical signal of multiple channels having different wavelengths transmitted via the optical fiber 30 that is single in the optical wavelength division multiplexing method, the optical communication module for optical wavelength division multiplexing according to the present exemplary embodiment may have a structure in which the wavelength selective member 80 is further inserted in the optical element 50 as illustrated in FIG. 2. The wavelength selective member 80 may be arranged between the first and second lenses 51 and 55. The optical communication module of FIG. 2 may be applied when light receiving devices are provided as the light devices 25, and further when light emitting devices are provided as the light devices 25. Also, the optical communication module of FIG. 2 simultaneously includes both the light emitting devices and the light receiving devices as the light devices 25 so that signal transmission and receiving may be simultaneously performed with a single module. In this case, a pair of a light emitting device and a light receiving device are arranged to correspond to one of the light devices 25.

When light beams having multiple wavelengths are emitted from the optical fiber 30 that is single, the light beam may be split according to the wavelength thereof by using the optical system of FIG. 2. The wavelength selective member 80 includes a plurality of filter areas 81, each of the filter areas 81 selectively transmitting a light beam having a predetermined wavelength. The filter areas 81 may be formed of a wavelength selective filter or an edge filter. For example, for a two channel optical communication module, two light devices 25 are provided. Accordingly, the first lens 51 of the optical element 50 is configured to have two lens areas corresponding to the two light devices 25. The wavelength selective member 80 may include two filter areas formed of the edge filter or wavelength selective filter. For three or more channel optical communication module, three or more light devices 25 are provided. Accordingly, the first lens 51 of the optical element 50 is configured to have three or more lens areas corresponding to the three or more light devices 25. The wavelength selective member 80 may include three or more filter areas in which the edge filter is used for filter areas for the longest channel and the shorted channel and the wavelength selective filter is used for a filter area for an intermediate channel. In the two channel optical communication module or three or more channel optical communication module, the wavelength selective filter may be used for all filter areas of the wavelength selective member 80.

The characteristic of the wavelength selective member 80 may change according to the angle of incident light. Thus, the first and second lenses 51 and 55 may be formed in various shapes capable of converting the light beam emitted from the optical fiber 30 that is single to a parallel beam with respect to the optical path of each channel, as described above. The wavelength selective member 80 may be arranged between the first and second lenses 51 and 55 in which the parallel beam travels.

A light beam having a particular wavelength corresponds to a single signal. Thus, the wavelength selective member 80 may be configured such that the filter areas 81 transmitting only a light beam having a particular wavelength corresponding to the number of signals may be arranged corresponding to the lens areas 53 of the first lens 51. An optical signal passing the filter area of the wavelength selective member 80 that transmits only a light beam having a wavelength may be recognized as a signal of a channel only when it passes one lens area of the first lens 51 and arrives at one light receiving device. If the optical signal having passed through one filter area of the wavelength selective member 80 passes through other lens areas, the optical signal is mixed with other signals of different channels.

Thus, in FIG. 2, a boundary of the filter areas 81 of the wavelength selective member 80 needs to be adjusted to be aligned to a boundary of the lens areas 53 of the first lens 51. However, a certain degree of deviation may be generated due to an error in the size and position of the filter. To prevent crosstalk that may be generated due to the deviation, the boundary between the lens areas 53 of the first lens 51 may be formed to have a surface that is not continuous with a periphery, that is, the lens areas 53. For example, as illustrate in FIG. 4, an area 57 having a thickness of 10-100 μm is prepared at the boundary between the lens areas 53 and the light passing through the area 57 is made to travel in a different direction from the light passing through the lens areas 53. The area 57 may be formed to have a different curvature or a different focal length from the lens areas 53.

In FIG. 1, the first lens 51 is illustrated to have the area 57 that is not continuous with the lens areas 53 at the boundary between the lens areas 53. In FIG. 1, the first lens 51 may be formed not to have the area 57.

Figure 5:
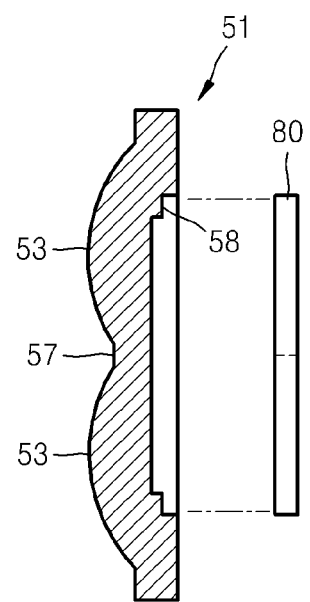
FIG. 5 is a cross-sectional view of the first lens of FIG. 2, schematically illustrating a wavelength selective member coupled to the first lens.

When the wavelength selective member 80 is provided between the first and second lenses 51 and 55 as illustrated in FIG. 2, the wavelength selective member 80 may be arranged by being coupled to the first lens 51. For example, a step 58 on which the wavelength selective member 80 is seated is provided on the surface of the first lens 51 facing the optical fiber 30, as illustrated in FIG. 5, so that the wavelength selective member 80 may be coupled, for example, fixedly, to the step 58 of the first lens 51.

Figure 6:
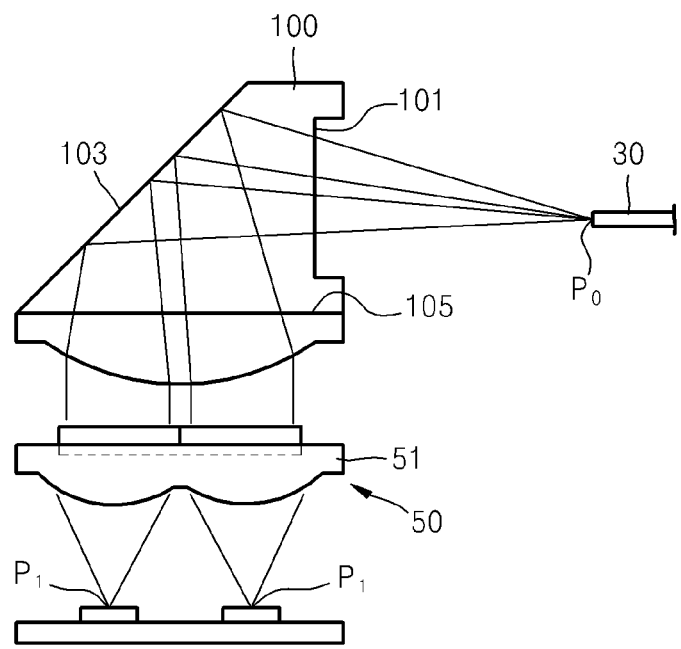
FIGS. 6 and 7 schematically illustrate optical communication modules for optical wavelength division multiplexing according to other exemplary embodiments of the present invention.
Figure 7:
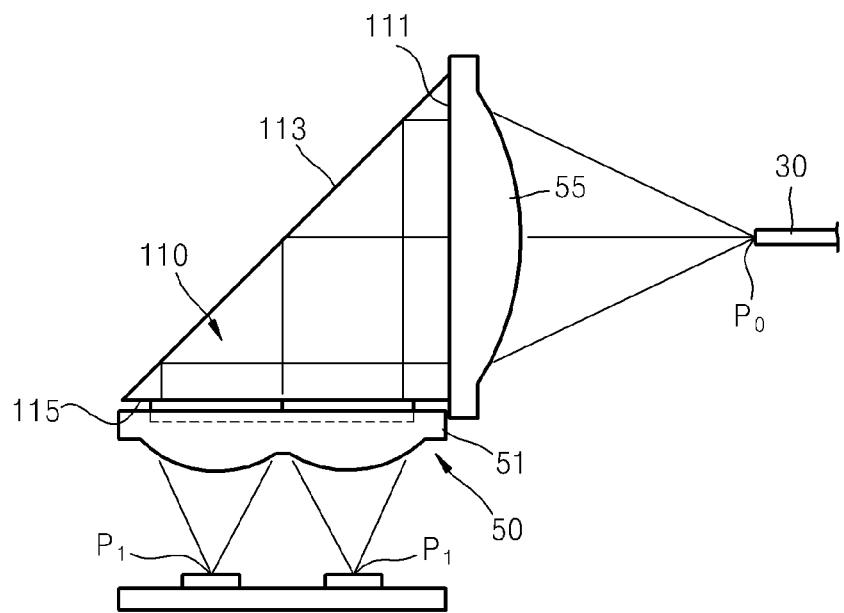

The optical communication module for optical wavelength division multiplexing according to the present invention may have path change members 100 and 110 respectively having inclined surfaces 103 and 113 by 45° between the light devices 25 and the optical fiber 30, as illustrated in FIGS. 6 and 7. FIG. 6 illustrate that the path change member 100 is arranged between the second lens 55 and the optical fiber 30. FIG. 7 illustrate that the path change member 110 is arranged between the first and second lenses 51 and 55.

Referring to FIG. 6, the path change member 100 includes a first input/output surface 101 facing the optical fiber 30, a second input/output surface 105 facing the second lens 55, and an inclined surface 103 inclined by about 45° to change the optical path by about 90° by internally reflecting the incident light through the first or second input/output surface 101 or 105.

Referring to FIG. 7, the path change member 110 includes a first input/output surface 111 facing the second lens 55, a second input/output surface 115 facing the first lens 51, and an inclined surface 113 inclined by about 45° to change the optical path by about 90° by internally reflecting the incident light through the first or second input/output surface 111 or 115. In FIG. 7, the second lens 55 is of a plano-convex mono lens type, a flat surface is arranged to face the first input/output surface 111, and the surface of the first lens 51 to which the wavelength selective member 80 is coupled is arranged to face the second input/output surface 115.

As described above with reference to FIGS. 2, 6, and 7, the optical communication module having the wavelength selective member 80 includes light receiving devices as the light devices 25 so as to be used as a signal receiving apparatus, or light emitting devices as the light devices 25 so as to be used as a signal transmitting apparatus. Also, the optical communication module having the wavelength selective member 80 may implement the optical wavelength division multiplexing.

In the above, the optical element that makes the light beam starting from a point $P_0$ converge at a plurality of points $P_1$ or the light beams starting from the plurality of points $P_1$ converge onto the a point $P_0$ is formed of a combination of two lenses. The optical element may include a single lens having a plurality of lens areas.

Figure 8:
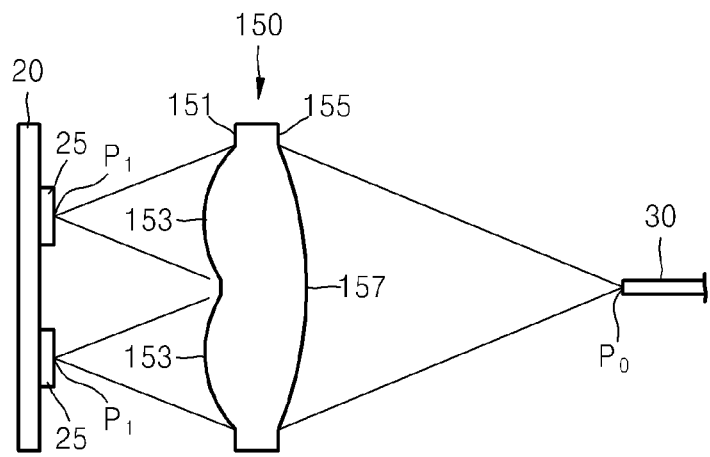
FIG. 8 schematically illustrates an optical communication module for optical wavelength division multiplexing according to another exemplary embodiment of the present invention.
Figure 9A:
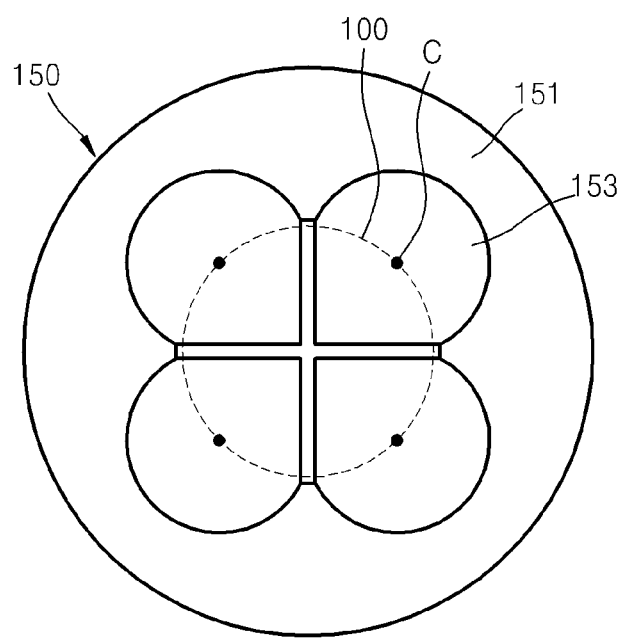
FIGS. 9A and 9B illustrate the shapes of the first and second surfaces of the optical element of FIG. 8.
Figure 9B:
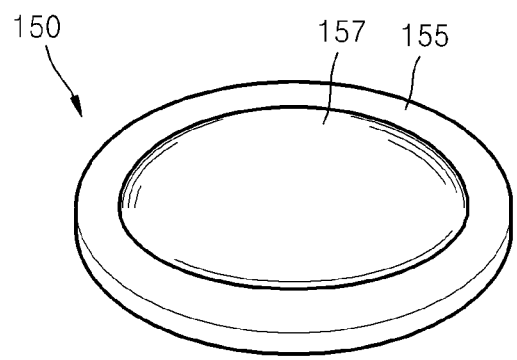
Figure 10:
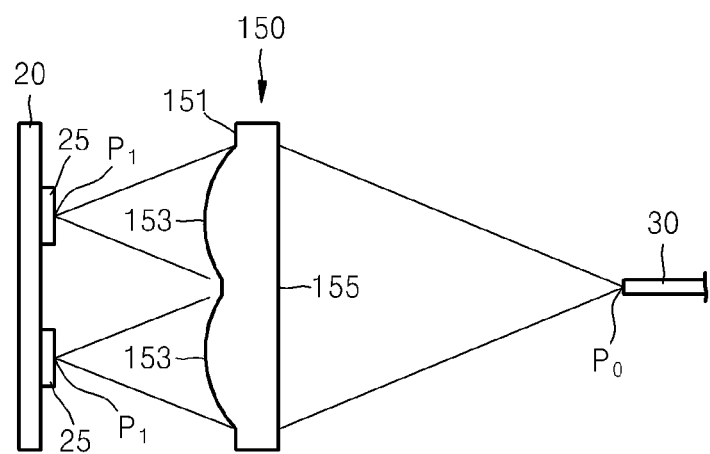
FIG. 10 schematically illustrates an optical communication module for optical wavelength division multiplexing according to another exemplary embodiment of the present invention.

FIG. 8 schematically illustrates an optical communication module for optical wavelength division multiplexing according to another exemplary embodiment of the present invention. FIGS. 9A and 9B illustrate the shapes of first and second surfaces 151 and 155 of the optical element 150 of FIG. 8. FIG. 10 schematically illustrates an optical communication module for optical wavelength division multiplexing according to another exemplary embodiment of the present invention. In FIGS. 8 and 10, like reference numerals denote like constituent elements and descriptions on the same constituent elements will be omitted herein.

Referring to FIGS. 8-9B, to converge the light emitted from the light devices 25 at the optical fiber 30 or to have the light transmitted through the optical fiber 30 that is single received by the light devices 25, the optical element 150 may have, for example, at least the first surface 151 facing the light devices 25 that has a plurality of lens areas 153 as illustrated in FIG. 9A and the second surface 155 facing the optical fiber 30 that has a single lens area 157 as illustrated in FIG. 9B.

The lens areas 153 of the optical element 150 may be arranged such that the centers of the lens areas 153 may be located at the same distance from a point. For example, each of the lens areas 153 may have a convex lens surface. In this case, the lens areas 153 may be arranged such that the apexes C of the convex lens surfaces of the lens areas 153 can be located on the circumference of a circle 100 with respect to a point.

FIG. 9A illustrates the four lens areas 153 formed on the first surface 151 as convex lens surfaces. That is, the first surface 151 of the optical element 150 may be formed by combining four lenses. The number of lenses to be combined may vary according to the number of the light devices 25 to be used. That is, the lens areas 153 are formed by combining a plurality of lenses in the number corresponding to the number of the light devices 25.

In FIGS. 8 and 9B, the second surface 155 of the optical element 150 is a mono lens area 157, for example, a mono convex lens surface. Instead of having the mono lens area 157 on the second surface 155, the optical element 150 may have the second surface 155 that is entirely flat as illustrated in FIG. 10. Also, the second surface 155 of the optical element 150 may be formed of a combination of multiple lenses equally or similar to the lens areas 153 of the first surface 151. The optical communication modules illustrated in FIGS. 8 and 10 in which the light emitting devices are used as the light devices 25 may be used as a transmitter.

In the above-described optical communication modules according to the various exemplary embodiments, the light devices 25, that is, the light emitting devices or the light receiving devices, are used by being attached to the sub-mount 20 for electrical connection. The precision of a die bonder is merely about several tens of micrometers and it is difficult to further adjust the precision.

Figure 11A:
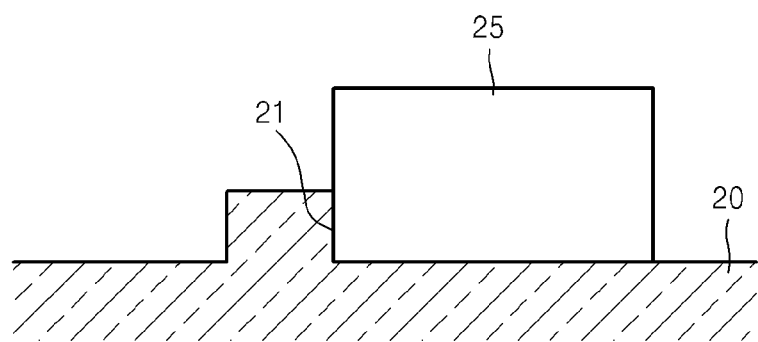
FIG. 11A illustrates the state in which an light device is mounted on a sub-mount having a step structure.
Figure 11B:
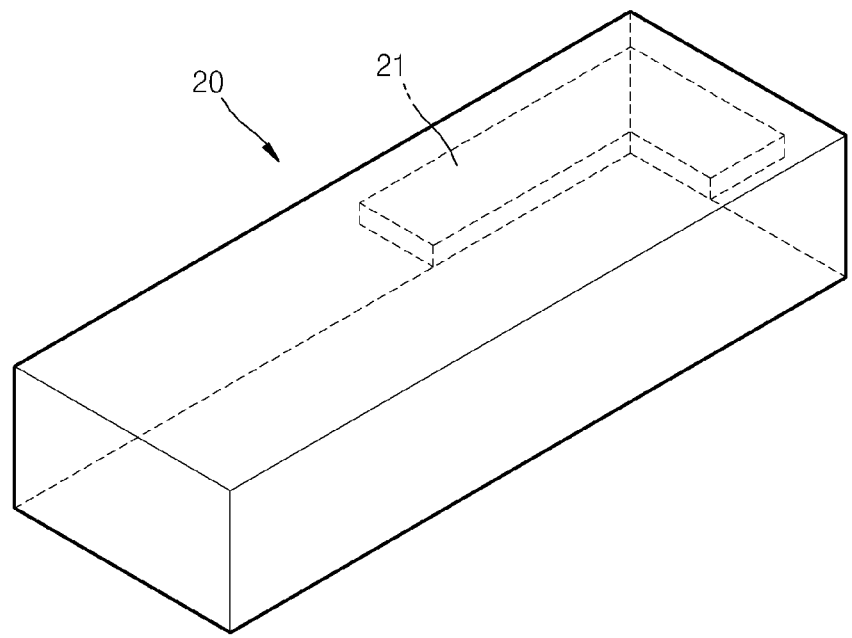
FIG. 11B is a perspective view of the sub-mount having a step structure.
Figure 12A:
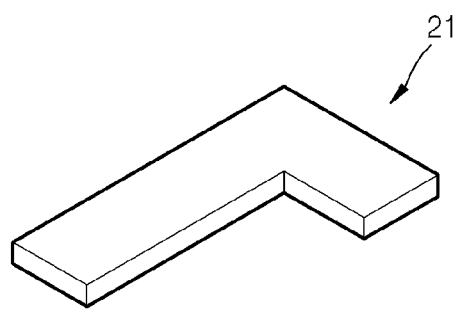
FIGS. 12A-12D illustrate various step structures according to exemplary embodiments of the present inventions.
Figure 12B:
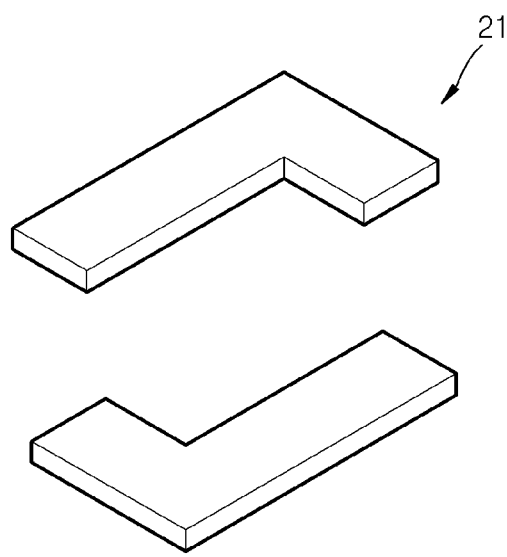

Thus, in the an optical communication module for optical wavelength division multiplexing according to the present exemplary embodiment, the sub-mount 20 may have a step structure 21 by which the light devices 25 are caught as illustrated in FIGS. 11A and 11B. When the step structure 21 is located at an accurate position, the light devices 25 that are caught by the step structure 12 may be placed at the accurate positions. By using the step structure 21, the positions of the light devices 25 on the sub-mount 20 may be accurately adjusted.

FIG. 11A illustrates the state in which one of the light devices 25 is mounted on the sub-mount 20 having the step structure 21. FIG. 11B is a perspective view of the sub-mount 20 having the step structure 21. FIG. 11B illustrates a case that the step structure 21 has, for example, a shape of "∟". FIGS. 12A-12D illustrate various shapes of the step structure 21. The step structure 21 may have various shapes such as the "∟" shape of FIG. 12A, the double "∟" shape of FIG. 12B, the "☐" shape of FIG. 12C, and the "Π" shape of FIG. 12D so that the positions of the light devices 25 may be accurately limited.

The step structure 21 of the sub-mount 20 may be manufactured by an etch process using a photolithography method. The use of the photolithography method may produce an accurate shape at a relative positional precision of several micrometers. Thus, by using the photolithography method, the relative positional precision of the light devices 25 may be obtained as the same level as that of a boundary surface of the step structure 21 manufactured by the etch process.

When the sub-mount 20 with the light devices 25 attached thereto and the above-described optical element 50 or 150 are coupled to the step structure 21 manufactured by the etch process, the light emitted from the light emitting devices can be combined in the optical fiber 30 that is single, or the light emitted from the optical fiber 30 that is single can be split and transmitted to multiple light receiving devices, by using a simple part structure.

As described above, in the optical communication module for optical wavelength division multiplexing according to the present invention, since optical signals having various wavelengths, that is, a plurality of optical signals of multiple channels, may be transmitted or received through the optical fiber 30 that is single, or optical signals having various wavelengths, that is, a plurality of optical signals of multiple channels, may be transmitted or received simultaneously or as necessary at different time points through the optical fiber 30 that is single, the optical communication module may greatly simplify the system configuration for signal transmission via digital video interactive (DVI), high definition multimedia interface (HDMI), or display port which use multiple channels. When the light emitting devices and the light receiving devices are arranged by being mixed with each other, bi-directional transmission such as signal transmission via direct digital control (DDC), RS232, audio, USB, or display port may be available.

Figure 13A:
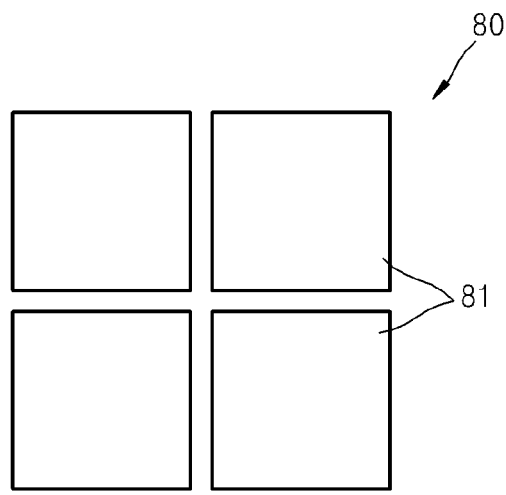
FIGS. 13A-13D illustrate various wavelength selective members according to exemplary embodiments of the present inventions.
Figure 13B:
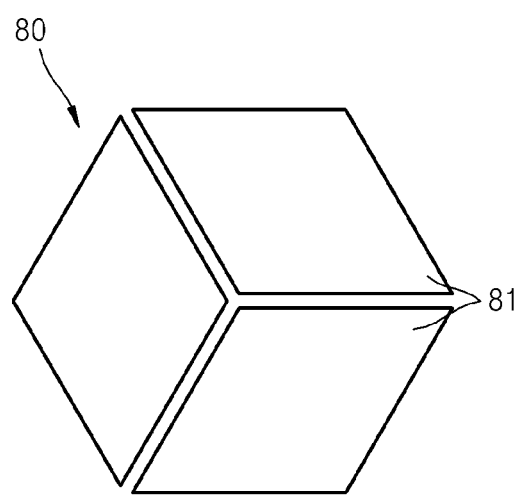
Figure 12C:
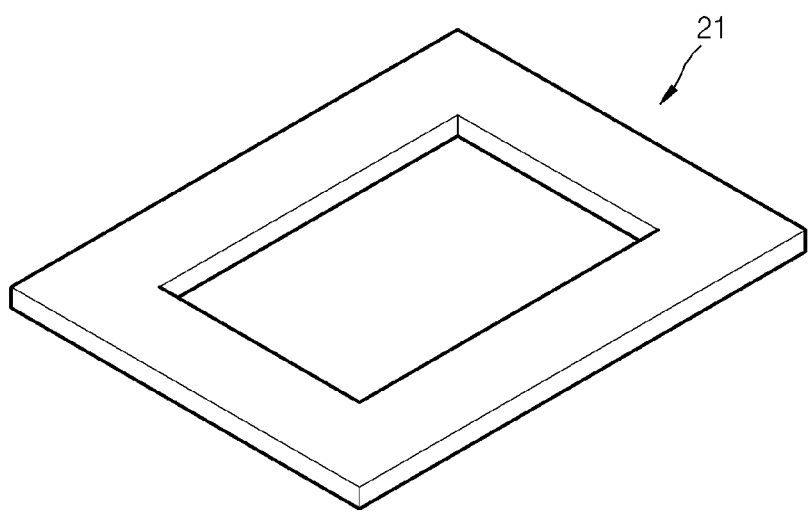
Figure 12D:
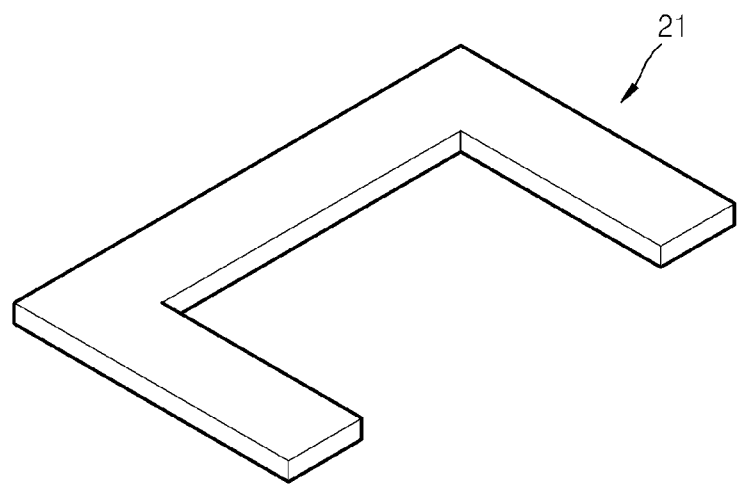
Figure 13C:
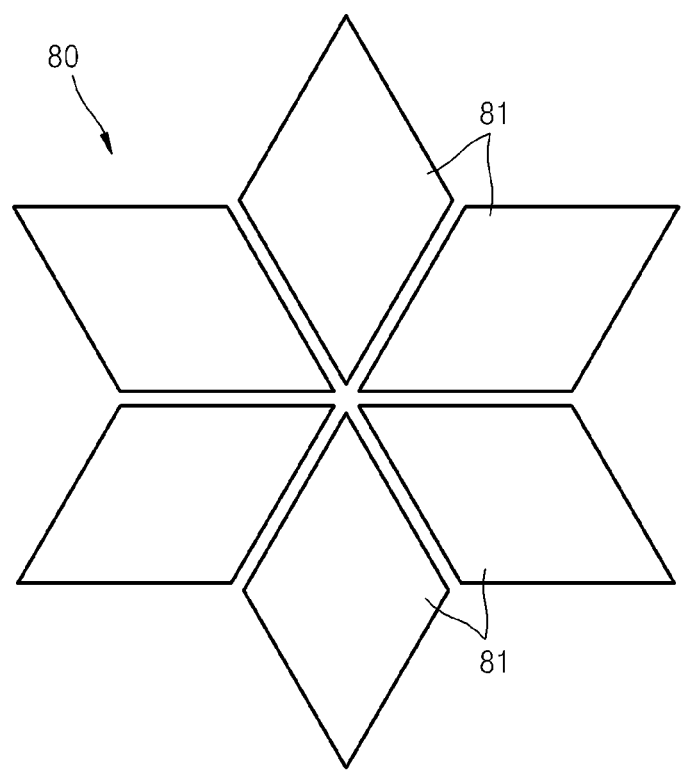
Figure 13D:
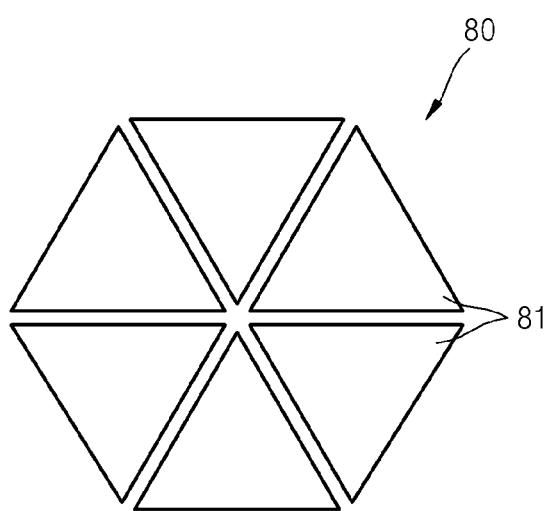

For the signal transmission of various methods, for example, 2, 3, 4, 5, or 6 channels are available and the number of channels for transmission or receiving may be adjusted according to the combination of the light devices. In particular, for 4 channels, four of the filter areas 81 of the wavelength selective member 80 may be arranged in a quadrangle shape, as illustrated in FIG. 13A. For 3 or 6 channels, three or six of the filter areas 81 of the wavelength selective member 80, each filter area having a parallelogram shape in which one angle of the parallelogram is 60° and the other angle is 120°, may be arranged as illustrated in FIGS. 13B and 13C. Also, for another 6 channels, six of the filter areas 81 of the wavelength selective member 80, each filter area having a regular triangle shape in which all interior angles are equally 60°, may be arranged as illustrated in FIG. 13D.

FIG. 13A illustrates that, for 4 channels, four of the filter areas 81 of the wavelength selective member 80 are arranged in a quadrangle shape. FIG. 13B illustrates that, for 3 channels, three of the filter areas 81 of the wavelength selective member 80, each filter area 81 having a parallelogram shape in which one angle of the parallelogram is 60° and the other angle is 120°, are arranged such that the sides of the three filter areas 81 having an interior angle of 120° can face one another. FIG. 13C illustrates that, for 6 channels, six of the filter areas 81 of the wavelength selective member 80, each filter area 81 having a parallelogram shape in which one angle of the parallelogram is 60° and the other angle is 120°, are arranged such that the sides of the six filter areas 81 having an interior angle of 60° can face one another. FIG. 13D illustrates that, for another 6 channels, six of the filter areas 81 of the wavelength selective member 80, each filter area having a regular triangle shape in which all interior angles are equally 60°, may be arranged such that the apexes of the six filter areas 81 can be arranged to face one another. In the arrangement of the lens areas 53 and 153 of the optical elements 50 and 150, the four lens areas 81 are arranged at an angle of 90° for 4 channels, as illustrated in FIGS. 4 and 9A, the three lens areas 81 are arranged at an angle of 120° for 3 channels, and the six lens areas 81 are arranged at an angle of 60° for 6 channels. The number and arrangement of the light devices 25 are provided corresponding to those of the lens areas 53 and 153.

As described above, to transmit multiple channel signals via a single optical fiber, multiple light emitting devices emitting light beams having different wavelengths, a semiconductor laser, for example, a surface laser VCSEL, is needed. Thus, when a plurality of light emitting devices are applied to the optical communication module for optical wavelength division multiplexing according to the present invention, the light emitting devices may be formed to emit light beams having different wavelengths.

For example, a semiconductor laser having a wavelength of 850 nm may be obtained by using a GaAs quantum well as a material emitting light. A semiconductor laser having a wavelength between 700-840 nm may be obtained by mixing Al to the material of a GaAs quantum well according to the mixing rate. A semiconductor laser having a wavelength between 870-1100 nm may be obtained by mixing In to the material of a GaAs quantum well according to the mixing rate. Also, when a lot of channels are used, a channel interval may be increased by increasing the channel number by mixing the two wavelength bands. Thus, a plurality of light emitting devices used for the optical communication module for optical wavelength division multiplexing according to the present invention may be provided to have a wide channel interval.

The DVI/HDMI field widely adopts a 4 channel method. A 6 channel method may be adopted by adding a bi-directional channel to process various additional signals in the DDC, RS232, audio, or USB. By designing the number of the light devices 25 mounted on the sub-mount 20 to fit to the required channel number, the optical communication module according to the present invention may be applied to a variety of fields needing multiple channels, for example, DVI/HDMI, DDC, RS232, audio, USB, or display port.

As described above, in the optical communication module for optical wavelength division multiplexing according to the present invention, the optical communication module for optical wavelength division multiplexing may be implemented by an optical communication module having a simple structure of optical parts to converge light beams having different wavelengths at a single optical fiber or to split a light beam emitted from a single optical fiber to be received by a plurality of light receiving devices according to the wavelength thereof.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An optical communication module for optical wavelength division multiplexing, the optical communication module comprising:
    a plurality of light devices emitting or receiving light beams having different wavelengths;
    a single optical fiber; and
    an optical element arranged between the plurality of light devices and the single optical fiber and having three or more lens areas to converge a light beam starting from a single point $P_0$ onto a plurality of points $P_1$, or light beams starting from the plurality of points $P_1$ onto the single point $P_0$, the optical element including a first lens located close to the plurality of points $P_1$ and having the plurality of lens areas and a second lens located close to the single point $P_0$, the optical element comprising a wavelength selective member having a plurality of filter areas for selectively transmitting a light beam having a predetermined wavelength and disposed between the first and second lenses
    wherein the plurality of lens areas are arranged such that center points of the plurality of lens areas are located at the same distance from a point, and the single point $P_0$ and the plurality of points $P_1$ are located at the opposite sides with respect to the optical element, and
    wherein the wavelength selective member of the optical element comprises three or more filter areas and, of the three or more filter areas, the filter areas for the longest wavelength channel and the shortest wavelength channel are formed of edge filters and at least one filter area for an intermediate wavelength channel is formed of the wavelength selective filter.

2. The optical communication module of claim 1, wherein each of the filter areas of the wavelength selective member has a rectangular shape, a parallelogram shape in which one angle is 60° and the other angle is 120°, or a regular triangle shape in which all angles are equally 60°.

3. The optical communication module of claim 1, wherein one of the first and second lenses is a lens producing a parallel beam and the other one is a focusing lens so that a light beam travels in form of a parallel beam between the first and second lenses.

4. The optical communication module of claim 1, further comprising a path change member changing an optical path by 90°, having an inclined surface inclined at 45° and provided on the optical path between the light devices and the optical fiber.

5. The optical communication module of claim 1, wherein the light devices, the optical element, and the optical fiber are arranged in a line.

6. The optical communication module of claim 1, further comprising a sub-mount having a step structure, wherein the light devices are attached at the step structure of the sub-mount.

* * * * *